United States Patent [19]

Kindig et al.

[11] Patent Number: 4,698,533
[45] Date of Patent: Oct. 6, 1987

[54] CONNECTION INSULATOR AND STATOR ASSEMBLY

[75] Inventors: Alan L. Kindig, Holland, Mich.; Ho H. Tew, Grove Crescent, Singapore

[73] Assignee: General Electric Company, Fort Wayne, Ind.

[21] Appl. No.: 886,709

[22] Filed: Jul. 18, 1986

Related U.S. Application Data

[62] Division of Ser. No. 617,177, Jun. 4, 1984, Pat. No. 4,602,424.

[51] Int. Cl.⁴ .................................................. H02K 11/00
[52] U.S. Cl. ......................................... 310/71; 310/42; 310/45; 174/74 A; 174/87; 174/DIG. 8
[58] Field of Search ................... 310/71, 208, 45, 254, 310/42, 259, 194, 260, 184; 174/74 A, 87, DIG. 8; 339/DIG. 1, DIG. 3, 278 R, 278 T; 29/596; 336/107, 192

[56] References Cited

U.S. PATENT DOCUMENTS

| Re. 30,817 | 12/1981 | Loyd | 174/DIG. 8 |
|---|---|---|---|
| 2,580,871 | 1/1952 | Wirtz | 310/194 |
| 3,219,857 | 11/1965 | Fisher | 310/71 |
| 3,259,864 | 7/1966 | Marzolf et al. | 336/192 |
| 3,303,243 | 2/1967 | Hughes | 264/22 |
| 3,441,759 | 4/1969 | Watkins | 310/71 |
| 3,525,799 | 8/1970 | Ellis | 339/DIG. 3 |
| 3,555,316 | 1/1971 | Bleich | 310/71 |
| 3,603,720 | 9/1971 | Rabie | 174/52 R |
| 3,742,123 | 6/1973 | Haub, Jr. | 174/138 F |
| 3,748,510 | 7/1973 | McNeal | 310/71 |
| 3,748,511 | 7/1973 | Crabb | 310/71 |
| 3,748,512 | 7/1973 | Crabb | 310/71 |
| 3,862,492 | 1/1975 | Crabb | 29/596 |
| 3,912,957 | 10/1975 | Reynolds | 310/71 |
| 4,227,103 | 10/1980 | Humes | 310/71 |
| 4,227,108 | 10/1980 | Washizu | 310/45 |
| 4,291,455 | 9/1981 | Schnyder | 29/596 |
| 4,341,921 | 7/1982 | Simpson | 174/DIG. 8 |
| 4,381,464 | 4/1983 | Schnyder | 310/45 |
| 4,403,162 | 9/1983 | Pallaro | 310/71 |

FOREIGN PATENT DOCUMENTS 2606401  9/1976  Fed. Rep. of Germany ........ 310/71

*Primary Examiner*—R. Skudy
*Attorney, Agent, or Firm*—Ralph E. Krisher, Jr.

[57] ABSTRACT

A connection insulator for a dynamoelectric machine having a magnetic core and at least one winding arranged thereon comprising a plurality of coils of wire conductors with end turns thereof projecting beyond side faces of the core and being subject to pressure forces during compacting and forming and with lead wires extending therefrom. The insulator is formed of a flexible heat-shrinkable electrical insulating material and comprises a tubular portion with an open end adapted to receive an electrical connection joining at least one of the lead wires with another wire and a closed end with an integral flat tab portion extending axially therefrom at a junction with the tubular portion. A substantial part of the tab portion spaced from the junction is adapted to be grippingly engaged by the end turns of one of the coils and a substantial part of the tubular portion spaced from the junction is adapted to be grippingly engaged by the end turns of an adjoining coil. The electrical connection is located within the tubular portion and adjacent the closed end thereof. The parts of the tubular and tab portions not engaged by the end turns of adjoining coils span a space between adjoining coils and are substantially unaffected by pressure forces applied during compacting and forming of the end turns. A stator assembly with lead wire connections insulated by these connection insulators and methods of forming such stator assemblies are also described.

25 Claims, 11 Drawing Figures

CONNECTION INSULATOR AND STATOR ASSEMBLY

This is a division of application Ser. No. 617,177, filed June 4, 1984, now U.S. Pat. No. 4,602,424.

FIELD OF THE INVENTION

This invention relates generally to dynamoelectric machines and more particularly to connection insulators and stator assemblies utilizing such connection insulation methods for making same.

BACKGROUND OF THE INVENTION

In the manufacture of alternating current dynamoelectric machines, such as induction motors, a number of phase windings are emplaced in a stator core of ferromagnetic material. These phase windings, formed of coils of insulated wire conductors and defining circumferentially spaced poles, must have lead wires thereof interconnected and connections made to insulated external power lead wires. As such connections are typically formed by mechanically crimping bared ends of such interconnected lead wires, these connections must be insulated. These insulated connections are subjected to high levels of electrical stress during motor operation and the windings are typically subjected during the manufacturing process to pressure forces to compact and form the end turns thereof. Also, mechanical crimping of the electrical connection may sometimes form small projecting metal burrs or sharp edges that could puncture or rupture the connector insulator or at least reduce its insulation value. It is important, therefore, that the connection insulator be able to undergo various steps in the motor manufacturing process and maintain its insulation value so that the motor will function reliably and effectively and have a long service life. This is particularly true for motors incorporated in a hermetically sealed compressor for an air conditioner, or refrigerator, for example, where motor failure means not simply replacement of the motor but the entire hermetically sealed compressor. In such uses the electrical connector should not contain any components or be fabricated from material which would during usage form compounds or substances which would deleteriously affect the refrigerant, lubricant, the wire insulation or other components of the motor-compressor unit.

A number of different connection insulators for motors are known such as those disclosed in co-assigned U.S. Pat. Nos. 3,219,857, 3,748,510, and 4,227,108. Another connection insulator for this purpose, but formed of heat-shrinkable material with the bore of the insulator containing a mastic-like adhesive material, is disclosed in U.S. Pat. No. 4,381,464.

It would, however, be advantageous and desirable to provide a connection insulator that would be even more effective in providing and maintaining high insulation values for the electrical connections insulated thereby both during fabrication and during operation of motors which incorporate such connection insulators in the stator assemblies thereof. Further, it is believed that further improvements can be made in stator assemblies utilizing such connector insulators and in methods for making such assemblies.

SUMMARY OF THE INVENTION

Among the several objects of the invention is the provision of improved connection insulators for dynamoelectric machines which insulators have improved effectiveness both during motor fabrication and during motor operation in maintaining a high insulation value and avoiding puncturing or weakening of the connector insulator by relatively sharp burrs and edges of the electrical connections being insulated thereby; the provision of such improved connection insulators which may be readily utilized in commercial motor production and do not require any changes in conventional motor production facilities; the provision of such improved connection insulators which minimize fabrication time in the production of motors and in which the major components of the motor remain unchanged; the provision of such improved connection insulators which have improved and more secure anchoring to the motor windings and better retention of the electrical connection insulated thereby; the provision of improved stator assemblies with lead wires insulated by such improved connection insulators which when incorporated in motors provide improved service life and reliability; and the provision of such connection insulators that require no mastic material to effect reliable retention of the connector being insulated and which are particularly useful in the production of hermetic motors.

Other objects and features will be in part apparent and in part pointed out hereinafter.

In general and in one form of the invention, as utilized in a dynamoelectric machine having a magnetic core and at least one winding arranged thereon comprising a plurality of coils of wire conductors with end turns thereof projecting beyond side faces of the core and being subject to pressure forces during compacting and forming and with lead wires extending therefrom, a connection insulator is formed of a flexible heat-shrinkable electrical insulating material. The insulator comprises a tubular portion with an open end adapted to receive an electrical connection joining at least one of the lead wires with another wire and a closed end with an integral flat tab portion extending axially therefrom at a junction with the tubular portion. A substantial part of the tab portion spaced from the junction is adapted to be grippingly engaged by the end turns of one of the coils and a substantial part of the tubular portion spaced from the junction is adapted to be grippingly engaged by the end turns of an adjoining coil. The electrical connection is located within the tubular portion and adjacent the closed end thereof. The parts of the tubular portion and the tab portion not engaged by the end turns of adjoining coils span a space therebetween and are substantially unaffected by pressure forces applied during compacting and forming of the end turns.

In general, and in another form of the invention, a stator assembly for a dynamoelectric machine comprises a magnetic core, at least one winding arranged thereon and comprising a plurality of coils of wire conductors with end turns thereof having been subjected to pressure forces during compacting and forming and projecting beyond side faces of the core and with lead wires extending therefrom, and a connection insulator of flexible heat-shrunk electrical insulating material. The insulator has a tubular portion with an open end receiving an electrical connection joining at least one of the lead wires with another wire and a closed end with an integral flat tab portion extending axially therefrom at a junction with the tubular portion. A substantial part of the free end of the tab portion is grippingly engaged by the end turns of one of the coils and the free end of the tubular portion is grippingly engaged by the end turns of an adjoining one of the coils. The electrical connection is located within the tubular portion and adjacent the closed end thereof. The parts of the tubular portion and the tab portion not engaged by the end turns of the adjoining coils span a space therebetween and are substantially unaffected by pressure forces applied during compacting and forming of the end turns.

In general, and in still another form of the invention, a method for making a stator assembly for a dynamoelectric machine, having a magnetic core and at least one winding arranged thereon comprising a plurality of coils of wire conductors with end turns thereof projecting beyond side faces of the core and with lead wires extending therefrom, comprises the steps of forming an electrical connection joining at least one of the lead wires with another wire. The connection is inserted into the open end of a tubular portion of a flexible heat-shrinkable electrical insulator having a closed end and an integral flat tab portion extending axially from the closed end of the tubular portion so as to position the electrical connection adjacent the closed end of the tubular portion. The insulator is heated to shrink it so as to grip the connection therein and the heat-shrunk connector-bearing insulator is positioned to locate a substantial part of the free end of the tab portion so as to engage the end turns of one coil and positioning the free end of the tubular portion so as to engage the end turns of an adjoining coil with the parts of the tubular portion and the tab portion not engaged by the end turns of the adjoining coils spanning a space therebetween. Pressure is applied to the end turns to compact and form them and the connection and the parts of the tubular portion and the tab portion not engaged by the end turns are substantially unaffected by pressure forces applied during compacting and forming of the end turns.

In general, and in a further form of the invention, a method for making a stator assembly for a dynamoelectric machine, having a magnetic core and at least one winding arranged thereon comprising a plurality of coils of wire conductors with end turns thereof projecting beyond side faces of the core and with lead wires extending therefrom, comprises the initial step of forming an electrical connection joining at least one of the lead wires with another wire. The connection is inserted into the open end of a tubular portion of a flexible heat-shrinkable electrical insulator having a closed end and an integral flat tab portion extending axially from the closed end of the tubular portion so as to position the electrical connection adjacent the closed end of the tubular portion. Pressure is applied to the end turns to compact and form them and the connection and the parts of the tubular portion and the tab portion not engaged by the end turns are substantially unaffected by pressure forces applied during such compacting and forming of the end turns. The insulator is heated to shink it so as to grip the connection therein.

BRIEF DESCRIPTION OF THE DRAWINGS

Corresponding reference characters indicate corresponding parts throughout the several views of the drawings.

The exemplifications set out herein illustrate preferred embodiments of the invention in several forms thereof and such exemplifications are not to be construed as limiting the scope of the disclosure or the scope of the invention in any manner.

DESCRIPTION OF PREFERRED EMBODIMENTS

Figure 1:
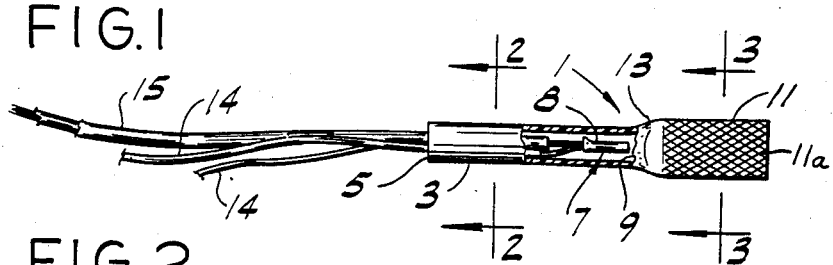
FIG. 1 is a plan view of a connection insulator in one form of the invention with a portion broken away to show the electrical connection insulated thereby and the interconnected lead wires extending therefrom.
Figure 2:
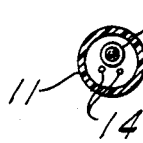
FIGS. 2 and 3 are sectional views taken on lines 2—2 and 3—3, respectively, of FIG. 1.
Figure 3:
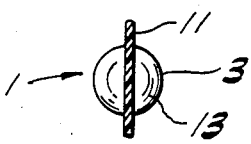
Figure 4:
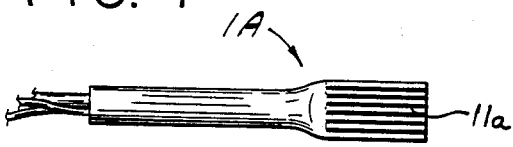
FIGS. 4–6 are plan views similar to FIG. 1 showing alternative embodiments of connection insulators in one form of the invention respectively.
Figure 5:
Figure 6:
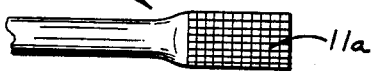

Referring now to the drawings in general, a connection insulator in one form of the invention is indicated generally at reference character 1 and is shown to have a generally elongate tubular portion 3 with an open end 5 for receiving an electrical connection 7, and a closed end 9 with a generally elongate integral flat tab portion 11 extending axially therefrom at a junction 13 with the tubular portion. Connection insulator 1 is formed from a flexible heat-shrinkable insulating material, such as for instance heat-shrinkable polyester film. A typical tubing from which connection insulators 1 may be fabricated may be formed, for example, from spiral-wound plies of polyethylene terephthlate film bonded together by a suitable adhesive with low extractables (2.5% max.). Such typical tubing may have a wall thickness of approximately 0.012" (0.3 mm.) a heat shrinkage of about 50/25% in diameter and approximately 30% in length, and a minimum dielectric strength of 4000 volts. Approximate dimensions of an exemplary insulator 1 are about 2" (51 mm.) in length with the tab portion 11 being about ⅝" (16 mm.) long and the tubular portion (inner length) being about 1⅜" (35 mm.) long and with an inside diameter of about ¼" (6 mm.). The flattened tab portion comprising about ⅓ the length of the connector 1 is formed by ultrasonic sealing and bonding while pressing an end portion of the desired length of the tubing between opposed platens having surface in a preselected pattern patterns to provide rough surfaces on both sides of the tab portion. The preselected pattern may include ridges 11a, so as to be knurled as shown in FIG. 1 or ribbed axially as in connection insulator 1A (FIG. 4), or ribbed transversely as in connection insulator 1B (FIG. 5), or ribbed both axially and transversely as in connection insulator 1C (FIG. 6).

Electrical connection 7 interconnects the bared ends of insulated lead wires or lead ends 14 to the bared end of another insulated lead wires or lead ends 14 to the bared end of another insulated lead wire or external lead 15. While such an electrical connection may be made by twisting the wire ends together and then soldering or brazing them, the more common practice is to form electrical connection 7 by inserting the bared lead wire ends into an uninsulated metal sleeve connector 8 (such as available under the trade designations "Essex" and "Amp") and mechanically crimping the sleeve to upset the metal thereby providing both a strong mechanical as well as a good electrical connection between the lead wires. Such electrical connections are typically used to form interpole connections, to electrically connect terminal ends of windings of the stator assemblies of dynamoelectric machines, such as electric motors, to each other and to interconnect winding lead wires and winding taps to external power leads.

Figure 7:
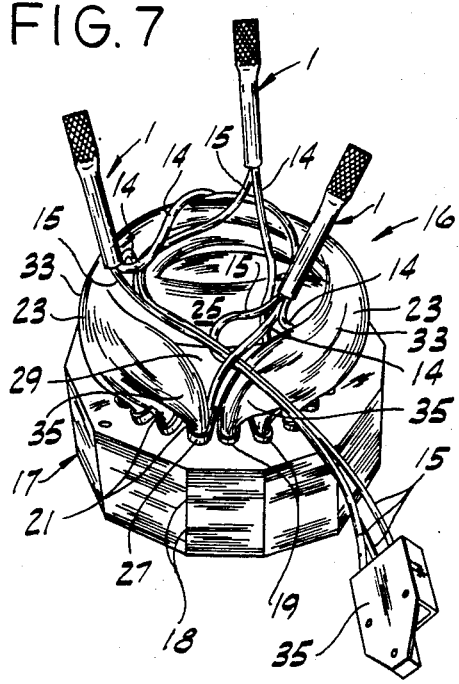
FIG. 7 is a perspective view of a partially completed stator assembly illustrating an initial step in a method for forming a stator assembly and with the heat-shrinkable connection insulators positioned on electrical connections to be insulated.

FIGS. 7-11 illustrate exemplary steps in a method for making stator assemblies of alternating current induction motors utilizing connection insulators 1, 1A, 1B, and 1C described above. Referring more particularly to FIG. 7, there is shown a stator assembly 16 in an intermediate stage of manufacture. The assembly includes a magnetic or ferromagnetic core 17 which may be conventionally fabricated from a number of identical laminations 18 punched from thin ferromagnetic sheet material. The laminations may be held in stacked, juxtaposed position by customary means such as interlaminate bonding material, welding across the stack periphery, or by cooperatng grooves and keys, and has a number of angularly spaced aligned teeth which terminate in a motor receiving bore, and define angularly spaced winding accommodating slots 19 therebetween. These slots receive a winding means comprising concentrically arranged coils 21 of a main or running winding 23 which form opposed running poles, and the concentrically arranged coils of a displaced-in-phase auxiliary or start winding 25, the end turns of these windings projecting beyond the side or end faces of stator core 17. Each of the coils is formed of a number of turns of enameled or magnet wire and is insulated from the walls of the winding slots by suitable insulating means, such as slot liners 27 or the like for instance and is retained in the slots by suitable means, such as for instance conventional slot wedges (not shown). The end turns of the coils of windings 23 and 25 in different phases may be, if desired, insulated one from the other by a layer of flexible sheet insulating material comprising "window" or between-phase insulation 29.

The bared ends of lead wires 14 of the windings are shown selectively connected at electrical connection 7 by sleeve connector 8 crimped to the bared ends of three insulated external power lead wires 15, the other ends thereof being connected to respective contacts of a connector plug 35. These lead wires may be employed to connect the windings in parallel or series circuit relation with a suitable source of power through customary switch means (not shown). Albeit not shown, lead wires 14 may be not only insulated by their enamel coating but also by lengths of flexible insulating tubing which provide high dielectric strength barriers to protect these lead wires in their routing from the winding coils to electrical connections 7.

Figure 8:
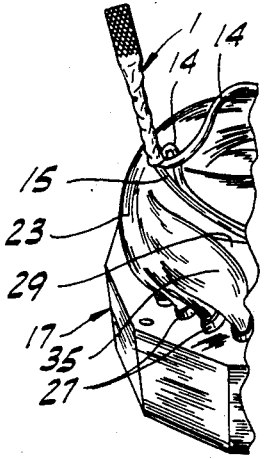
FIG. 8 is a fragmentary view taken from FIG. 7 after a heating step to shrink the connection insulators and grip the electrical connection being insulated thereby.

Connection insulators 1 are placed over the respective electrical connections 7 as shown in FIG. 7. The inner dimensions of the tubular portion 3 are sufficiently generous to easily accept the interconnected lead wires 14 and 15 and the crimped sleeve connector 8 which is positioned within the tubular portion 3 and adjacent the closed end 9 thereof. The stator assembly, or just the connecting insulators, may then be heated by any conventional means (such as infrared heat lamps, as the stator assembly is moved on the production conveyor) to shrink them so as to grip the lead wires 14 and 15 and the crimped sleeve connector 8 as illustrated in FIG. 8. The electrical connections 7 which are protected and insulated by the heat shrunk connection insulators 1 are then positioned (FIG. 9) in respect to the outer or main winding 23 so as to locate a substantial part of the free end of tab portion 11 in engagement with the inner surface of the end turns of the coils of winding 25 and between these and the outer surface of the inner or auxiliary winding coil contiguous thereto, and preferably with the insulated connection located on the outside of interphase insulation layer 29. A substantial part of the free end of the tubular portion 3 is positioned in engagement with the inner surface of the end turns of the adjoining coil or coils of winding 25 and the outer surface of the auxiliary winding coil contiguous thereto, and preferably with the insulated connection on the outside of interphase insulation layer 29. The parts of the tubular and tab portions not so engaged by the end turns of these adjoining coils span or bridge the space between these winding coils.

Figure 10:
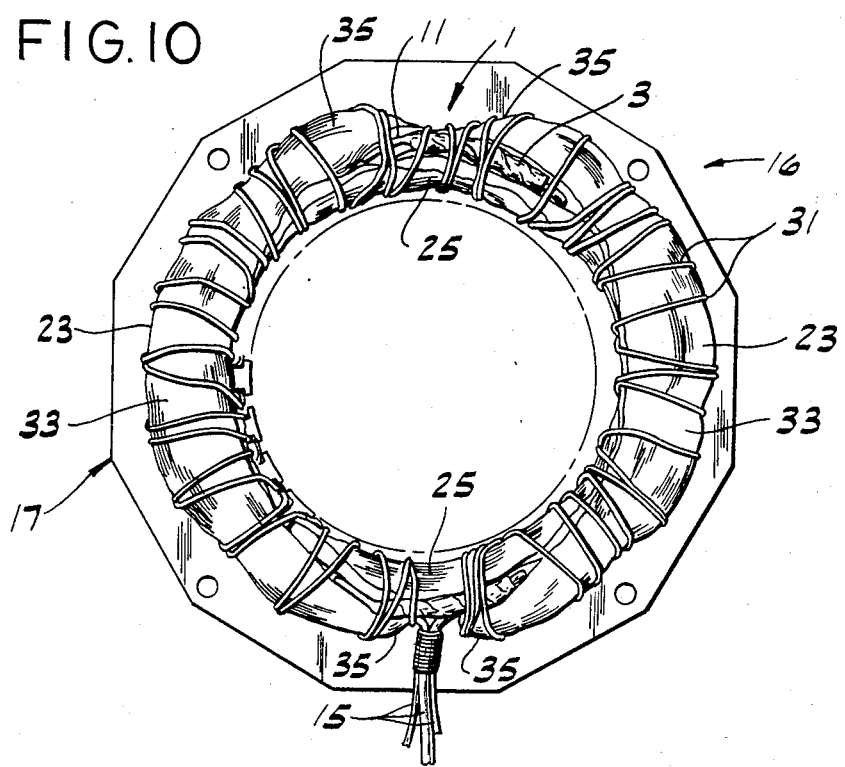
FIGS. 10 and 11 are, respectively, a plan view and a side elevational view of the completed stator assembly in one form of the invention after end turn forming and lacing on a larger scale than FIG. 9.
Figure 11:
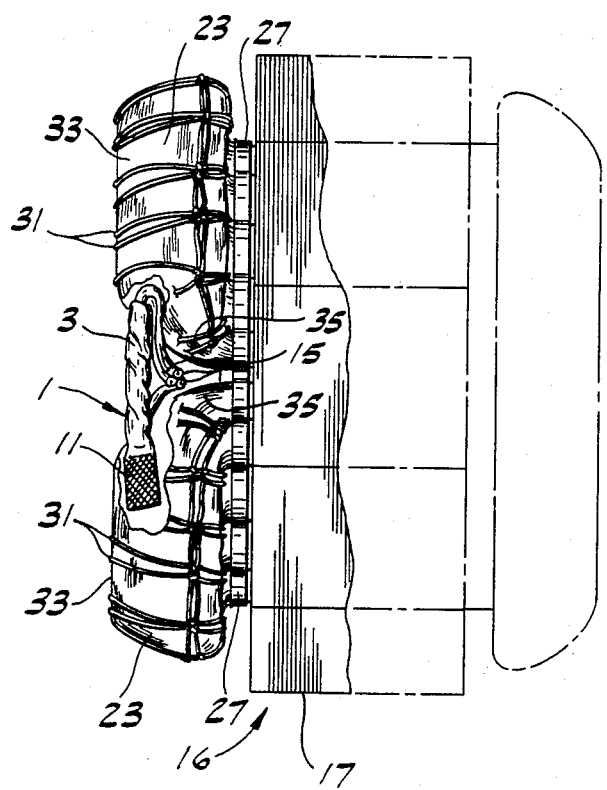

After so positioning the insulated connections the stator assembly is subjected to a pressing operation for shaping and compressing the end turns of the windings and then, preferably, they are laced and tied. As illustrated in FIGS. 10 and 11, this may be accomplished by tightly wrapping cord 31, which may be formed from polyester textile fibers sold under the trade designation "Dacron", around the end turns of windings 23 and 25 to hold them together as a unitary mass. As compacted the end turns of the coils of the windings will have flattened compressed central portions 33 with knee portions 35 at the corners thereof. During this application of pressure forces to the end turns substantial parts of the free ends of the tubing and tab portions of the connection insulators 1 are grippingly engaged by the knee portions 35 of adjoining coils of the windings so as to firmly anchor both ends of insulator 1. The roughened surfaces of tab portion 11 provide advantageous frictional engagement of this purpose. However, as the connection 7 is positioned adjacent the junction 13 of insulator 1 and this portion of this insulated connection is in the space, or at the break, between the main winding coils, it is substantially unaffected by the pressure forces applied during compacting and forming of the end turns. Thus any burrs or sharp edges of electrical connection 7 formed during mechanical crimping of crimped sleeve connector 8 will not be forced against the inner surfaces of tubular portions 3 to either reduce the insulation value of, or actually puncture, the insulator wall.

Figure 9:
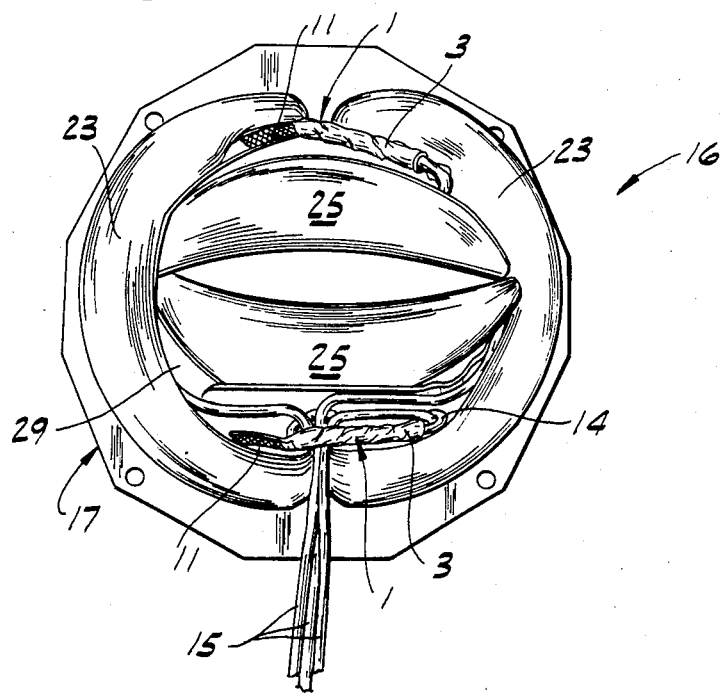
FIG. 9 is a plan view of the stator assembly after the insulated connections and leads are positioned between coils of motor windings and prior to compacting and forming the end turns.

An optional, but preferred, step in the manufacture of an hermetic motor is to craze anneal the stator assembly following lacing. This step further ensures the integrity of the enamel coating on the winding conductors which can become crazed during the compacting and forming operation. If desired, the heating of the connection insulators to shrink them can conveniently take place during such craze annealing rather than effecting heat shrinking before tucking the connections protected by the preshrunk connection insulators between the end turns of adjoining main winding coils (FIGS. 8 and 9). An exemplary craze annealing operation will subject the compacted and formed units to a temperature of about 95° C. for up to 15 minutes. Thus the heat shrinking of the connection insulators and the craze annealing may be carried out concurrently. As the lacing cord 31 will shrink (in the order of 7-8%) when so heated, it will increasingly tighten about the end turns of the windings.

The connection insulators and stator assemblies described above are particularly advantageous in the production of hermetic motors for use in refrigerant compressor units as they require no mastic material and are free of any components which during motor operation would form compounds or substances which would deleteriously affect the refrigerant, lubricant, wire insulation, or other components of a motor-compressor unit.

From the foregoing it is now apparent that novel connection insulators as well as novel stator assemblies incorporating such connection insulators have been disclosed meeting the objects and advantageous features set out hereinbefore, as well as others, and that modifications as to the precise configurations, connections and details of such connection insulators and stator assemblies may be made by those having ordinary skill in the art without departing from the spirit of the invention or the scope thereof as set out by the claims which follow.

What we claim as new and desire to secure by Letters Patent of the United States is:

1. A connection insulator of a heat shrinkable electrical insulating material for use in a dynamoelectric machine including a magnetic core and at least one winding arranged thereon having a plurality of coils of wire conductors with end turns thereof projecting beyond end faces of the cores and with lead wires extending from at least one of the end turns of the coils, and an electrical connection joining at least one of the lead wires with at least another wire, the connection insulator comprising: a tubular portion with an open end adapted to receive the electrical connection and a part of the at least one wire and the another wire and with a closed end adapted to be disposed at least adjacent the electrical connection, an integral flat tab portion extending axially from said closed end at a junction with said tubular portion, and surfaces on said flat tab portion with a plurality of ridges in said surfaces, a substantial part of said ridges in said surfaces of said flat tab portion spaced from said junction adapted to be grippingly engaged by the at least one end turns of one of the coils and a substantial part of said tubular portion spaced from said junction adapted to be grippingly engaged by the at least one end turns of an adjoining coil, and the parts of said tubular portion and said flat tab portion not engaged by the at least one end turns of the one and adjoining coils being adapted to span a space therebetween.

2. A connection insulator as set forth in claim 1 in which said ridges are parallel and extend axially relative to the length of the connection insulator.

3. A connection insulator as set forth in claim 1 in which said ridges are parallel and extend transversely relative to the length of the connection insulator.

4. A connection insulator as set forth in claim 1 in which said ridges extend both axially and transversely relative to the length of the connection insulator.

5. A connection insulator as set forth in claim 1 in which the connection insulator is formed from spiral wound polyester film tubing.

6. A connection insulator as set forth in claim 1 in which the length of the connection tab portion is about one-third length of said insulator.

7. A stator assembly for a dynamoelectric machine comprising: a magnetic core having a pair of generally opposite end faces; at least one winding arranged on said core and including a plurality of coils of wire conductors with end turns thereof projecting beyond said end faces of said core and with lead wires extending from at least one of said end turns of said coils, and at least one electrical connection joining at least one of said lead wires with at least another wire; at least one connection insulator of flexible heat-shrunk electrical insulating material including a tubular portion with an open end receiving said electrical connection and a closed end with an integral flat tab portion extending therefrom at a junction with said tubular portion, and surfaces on said flat tab portion with a plurality of ridges in said surfaces, a substantial part of said ridges in said flat tab portion being grippingly engaged by said at least one end turns of said coils and a substantial part of said tubular portion being grippingly engages by said at least one end turns of another of said coils adjacent said one coil, said electrical connection being located within said tubular portion and adjacent said closed end thereof, and the parts of said tubular portion and said flat tab portion not engaged by said at least one end turns of said one and another coils spanning a space therebetween.

8. A stator assembly as set forth in claim 7 in which said connection ridges are parallel and extend axially relative to the length of said insulator.

9. A stator assembly as set forth in claim 7 in which said ridges are parallel and extend transversely relative to the length of said connection insulator.

10. A stator assembly as set forth in claim 7 in which said ridges extend both axially and transversely relative to the length of said connection insulator.

11. A stator assembly as set forth in claim 7 in which said connection insulator is formed from spiral wound polyester film tubing.

12. A stator assembly as set forth in claim 7 in which the length of said flat tab portion is about one-third the length of said connection insulator.

13. A stator assembly as set forth in claim 7 in which said at least one lead wire and said wire have bared ends and said electrical connection comprising a crimped uninsulated metal sleeve around said bared ends.

14. A stator assembly as set forth in claim 7 wherein said at least one end turns of said coils have a compressed central portion with knee portions at the corners thereof and the substantial parts of said tubular portion and said ridges on said flat tab portion are respectively grippingly engaged by said knee portions of said one and another coils.

15. A stator assembly as set forth in claim 7 further comprising a second winding arranged on said core and having a plurality of coils of wire conductors with end turns thereof projecting beyond said end faces, said second winding coil being offset circumferentially relative to said coils of said at least one winding, said second winding comprising an inner winding layer and said at least one winding comprising an outer winding layer, said connection insulator being inteprosed between said inner and outer winding layers with the substantial part of said ridges in said flat tab portion grippingly engaged between said at least one end turns of said one coil of said outer winding layer and one of said end turns of one of said coils of said inner winding layer and with the substantial part of said tubular portion grippingly engaged between said at least one end turns of said another coil of said outer layer and said one end turns of another of said coils of said inner layer.

16. A stator assembly as set forth in claim 15 wherein said at least one end turns of said at least one winding have a compressed central portion with knee portions at the corners thereof and the substantial parts of said tubular portion and said ridges in said flat tab portion are respectively grippingly engaged by said knee portions of said one and another coils of said outer winding layer.

17. A stator assembly as set forth in claim 15 further comprising a layer of flexible sheet insulation material interposed between at least said end turns of said coils of said inner and outer winding layers.

18. A connection insulator of a heat shrinkable electrical insulating material for association with an electrical connection joining a plurality of lead conductors of winding means for a dynamoelectric machine, the connection insulator comprising:

a generally elongate tubular portion adapted to be heat shrunk into engagement about the electrical connection and a part of the lead conductors, said tubular portion including an open end adapted to receive the electrical connection and the lead conductor parts within said tubular portion, and a closed end generally opposite said open end; and a generally elongate tab portion integral with said tubular portion and extending generally axially from said closed end along a substantial part of the connection insulator, said tab portion including a pair of generally opposite surfaces, and a plurality of ridges arranged in a preselected pattern in said opposite surfaces, respectively.

19. A connection insulator as set forth in claim 18 wherein said ridges are arranged at least generally parallel to each other in the preselected pattern and extend at least generally axially relative to the length of said tab portion.

20. A connection insulator as set forth in claims 18 wherein said ridges are arranged at least generally parallel to each other in the preselected pattern and extend at least generally transversely relative to the length of said tab portion.

21. A connection insulator as set forth in claim 18 wherein said ridges are arranged in the preselected pattern so as to extend both axially and transversely relative to the length of said tab portion.

22. A connection insulator as set forth in claim 18 wherein some of said ridges are arranged at least generally parallel to each other in the preselected pattern so as to extend at least generally axially relative to the length of said tab portion and others of said ridges are arranged at least generally parallel to each other in the preselected pattern so as to extend at least generally transversely relative to the length of said tab portion thereby to intersect with said some ridges, respectively.

23. A stator assembly for a dynamoelectric machine comprising:

a core of ferromagnetic material having a pair of generally opposite end faces;

winding means for association with said core and including a plurality of coils of a conductor, a pair of generally annular opposite groupings of end turns of said coils arranged adjacent said opposite end faces, respectively, a set of integral lead ends of said conductor extending from at least one of said opposite end turn groupings, and at least one electrical connection joining at least two of said integral lead ends; and at least one connection insulator of a heat shrinkable electrical insulating material including a tubular portion heat shrunk into engagement about said at least one electrical connection and a part of said at least two integral lead ends, an open end in said tubular portion disposed about said at least two integral lead end parts, a closed end in said tubular portion disposed at least adjacent said at least one electrical connection, a tab portion integral with said tubular portion adjacent said closed end, a pair of generally opposite surfaces on said tab portion, and a plurality of ridges arranged in a preselected pattern in said opposite surfaces, a part of said tubular portion adjacent said open end and at least a part of said ridges in said tab portion being gripped in engagement by said at least one opposite end turn grouping, respectively.

24. A stator assembly as set forth in claim 23 further comprising at least one external lead, said tubular portion being heat shrunk into engagement about a part of said at least one external lead with said open end being disposed about said at least one external lead part, and said at least one electrical connection also joining said at least one external lead with said at least two integral lead ends.

25. A stator assembly as set forth in claim 24 further comprising a connector plug, said at least one external lead being connected in circuit relation with said connector plug.

* * * * *